F. L. CAPPS & J. J. SCULLY.
SHAVING MACHINE FOR SOUND RECORD TABLETS.
APPLICATION FILED OCT. 14, 1915.

1,227,748.

Patented May 29, 1917.
9 SHEETS—SHEET 2.

INVENTORS
Frank L. Capps
and John J. Scully
BY
Mauro, Cameron, Lewis & Massie
ATTORNEYS.

F. L. CAPPS & J. J. SCULLY.
SHAVING MACHINE FOR SOUND RECORD TABLETS.
APPLICATION FILED OCT. 14, 1915.

1,227,748.

Patented May 29, 1917.
9 SHEETS—SHEET 4.

INVENTORS
Frank L. Capps
and John J. Scully
BY
Mauro, Cameron, Lewis & Massie
ATTORNEYS

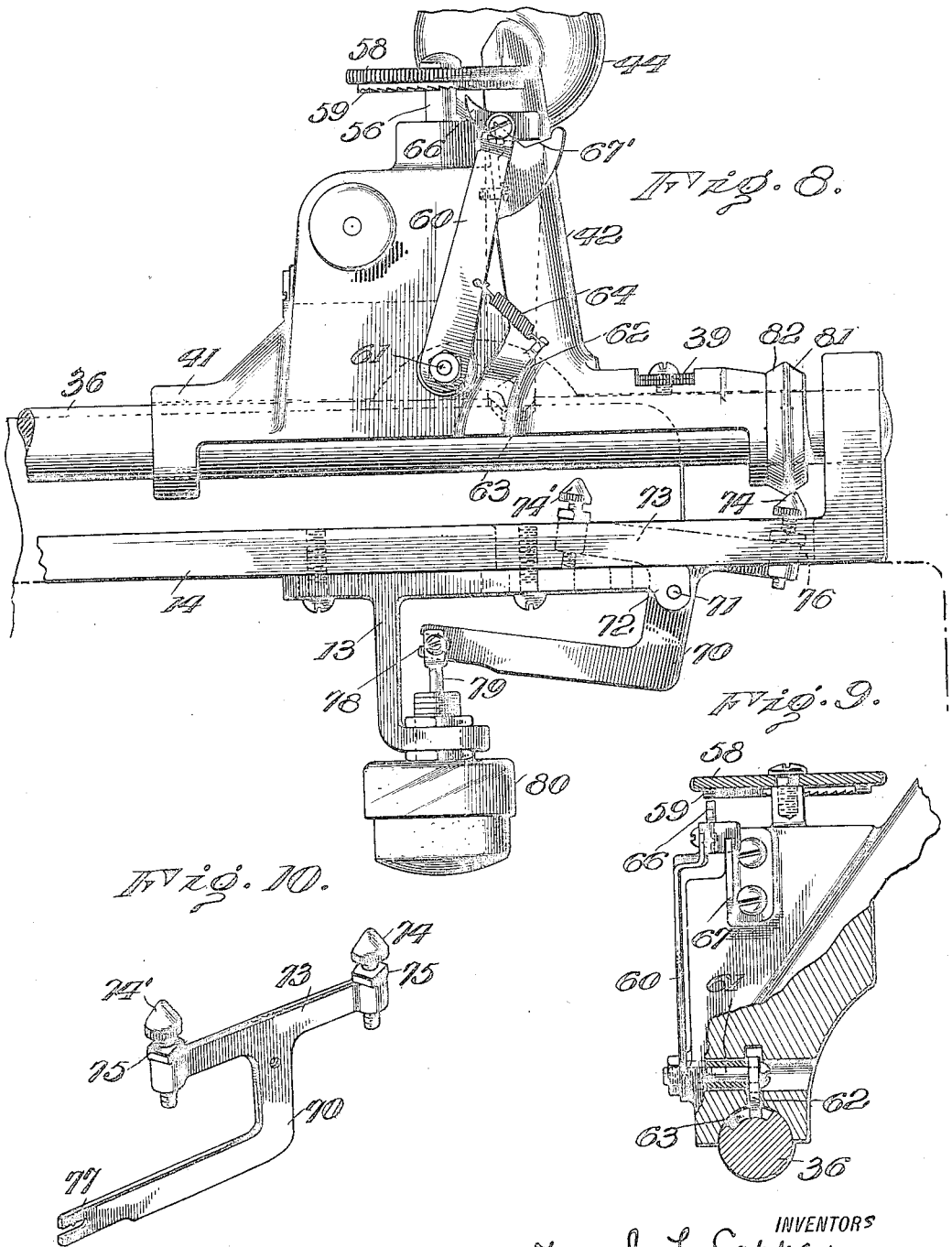

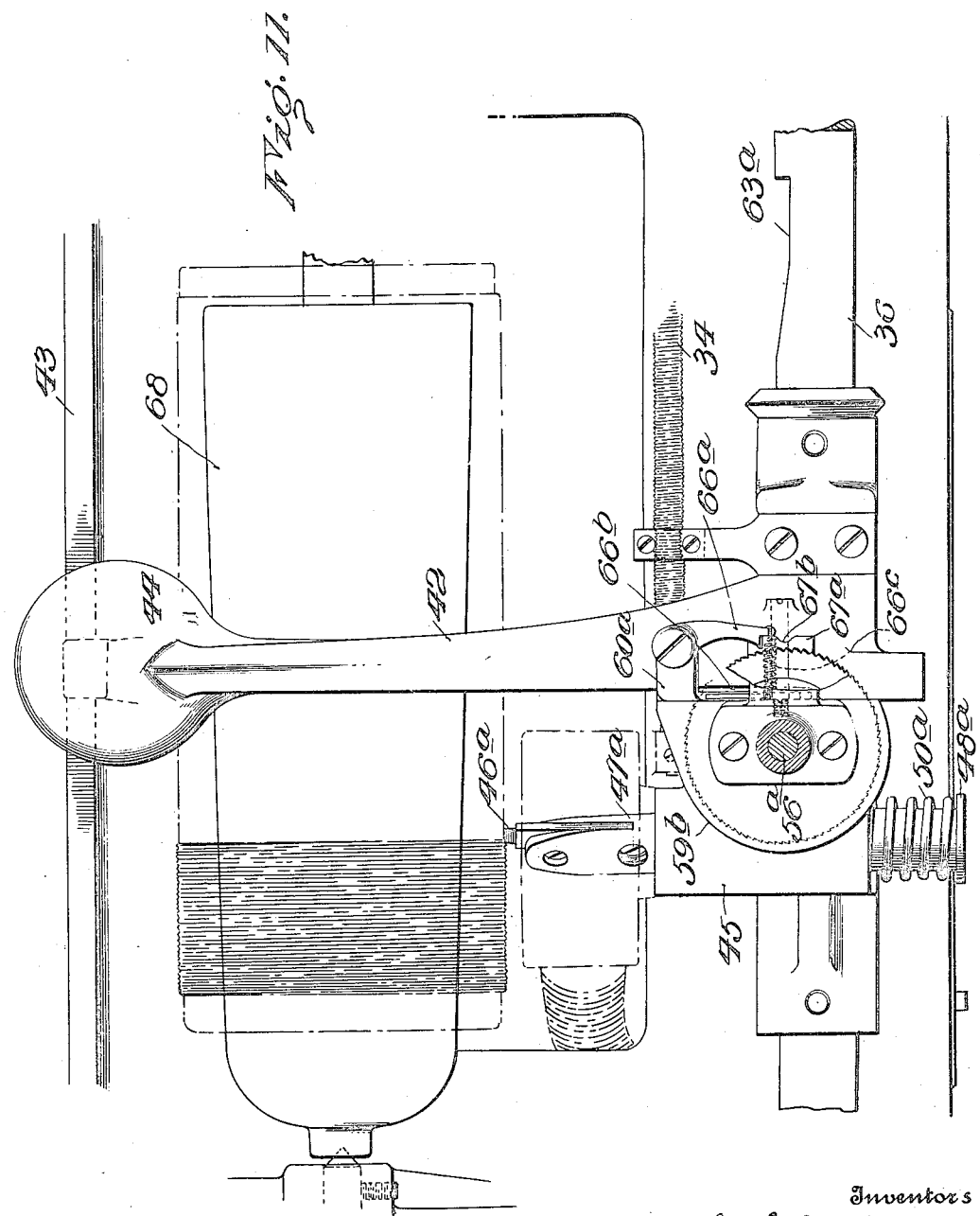

F. L. CAPPS & J. J. SCULLY.
SHAVING MACHINE FOR SOUND RECORD TABLETS.
APPLICATION FILED OCT. 14, 1915.
1,227,748.
Patented May 29, 1917.
9 SHEETS—SHEET 7.
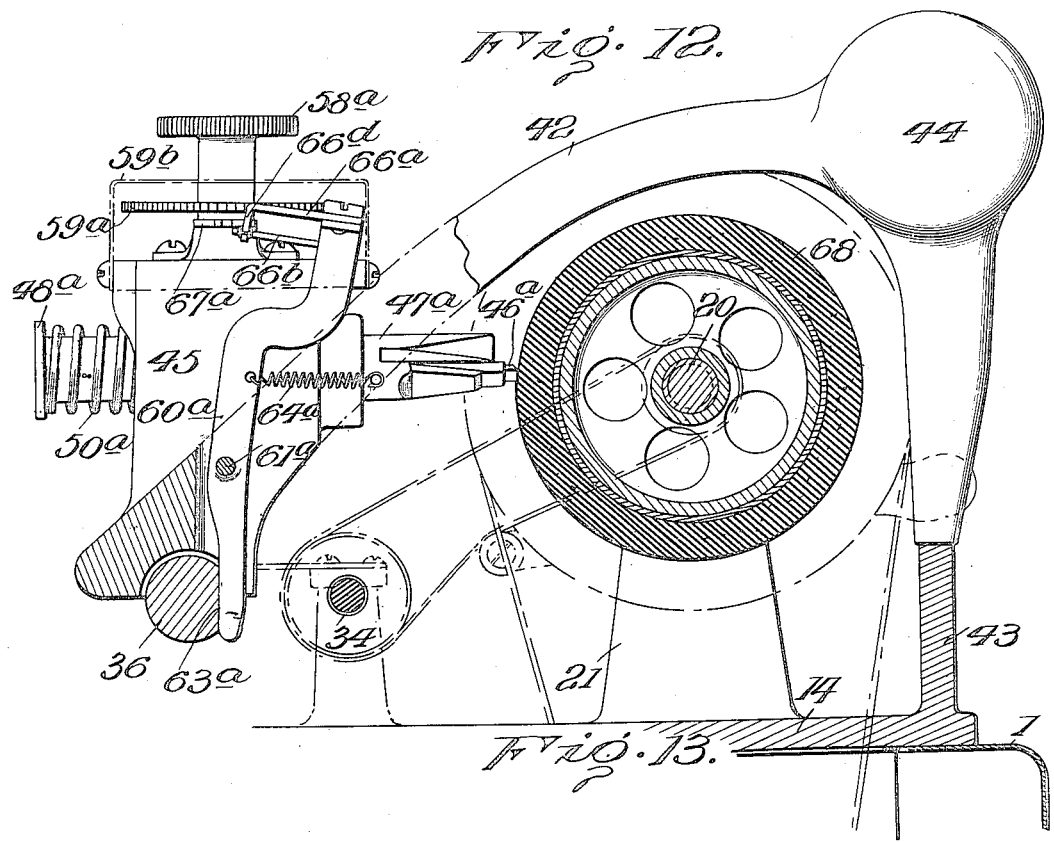
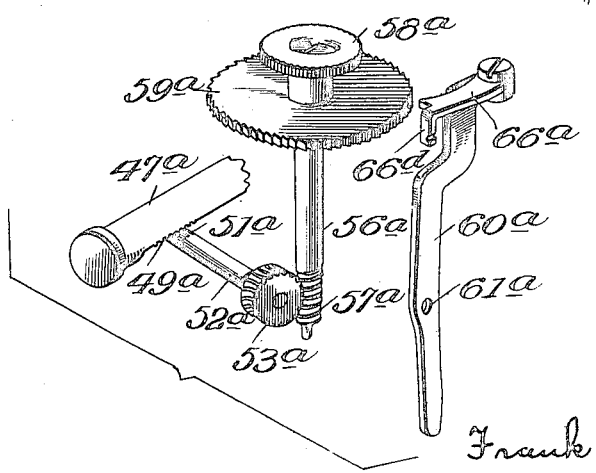
Inventors
Frank L. Capps
and
John J. Scully
By Mauro, Cameron, Lewis & Massie,
Attorneys F. L. CAPPS & J. J. SCULLY.
SHAVING MACHINE FOR SOUND RECORD TABLETS.
APPLICATION FILED OCT. 14, 1915.
1,227,748.
Patented May 29, 1917.
9 SHEETS—SHEET 8.
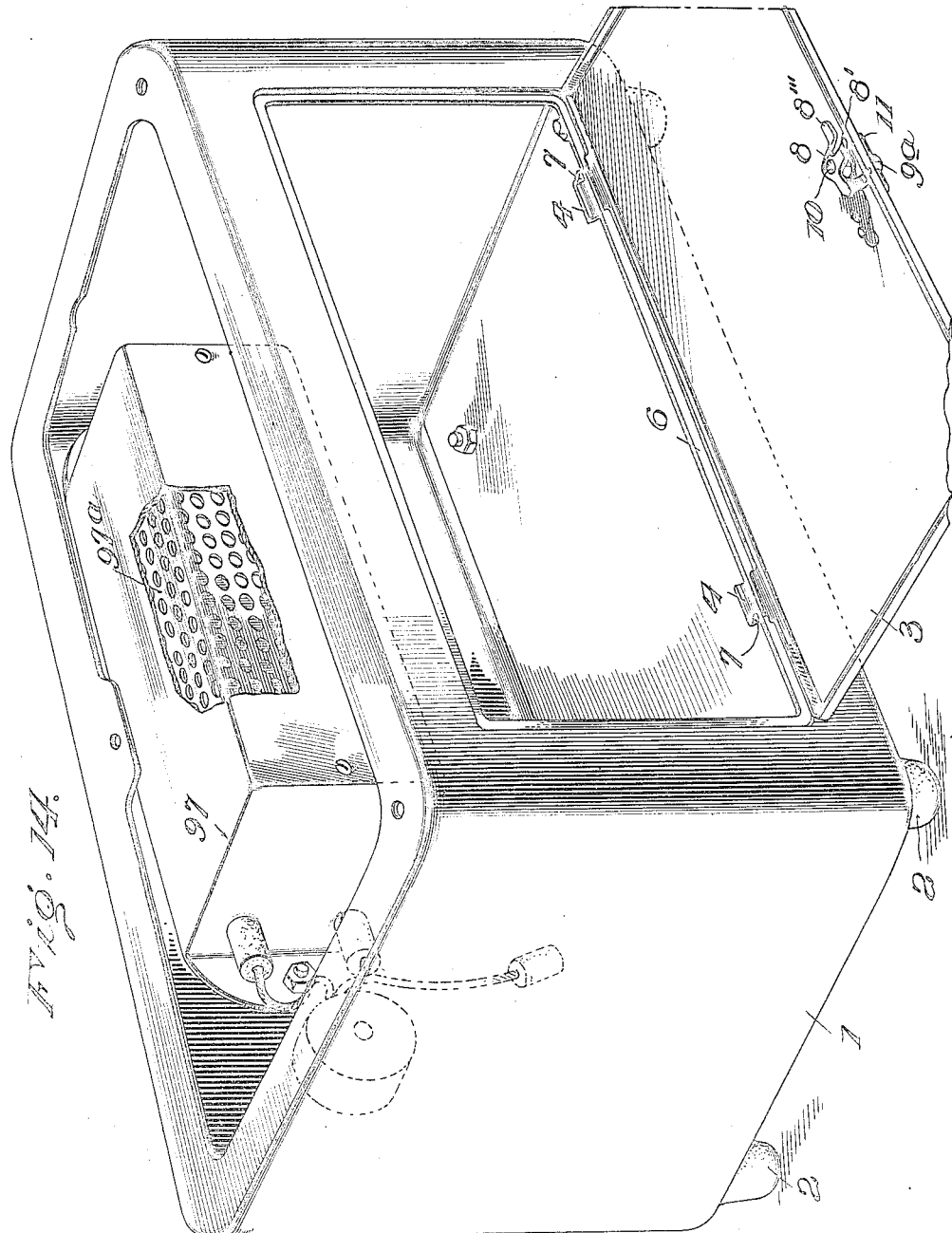
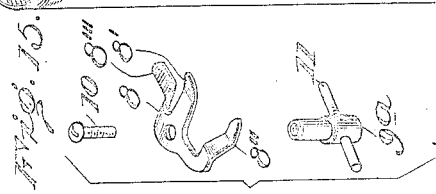
INVENTORS
Frank L. Capps
and John J. Scully
BY
Munn, Cameron,
Lewis & Massie
ATTORNEYS.

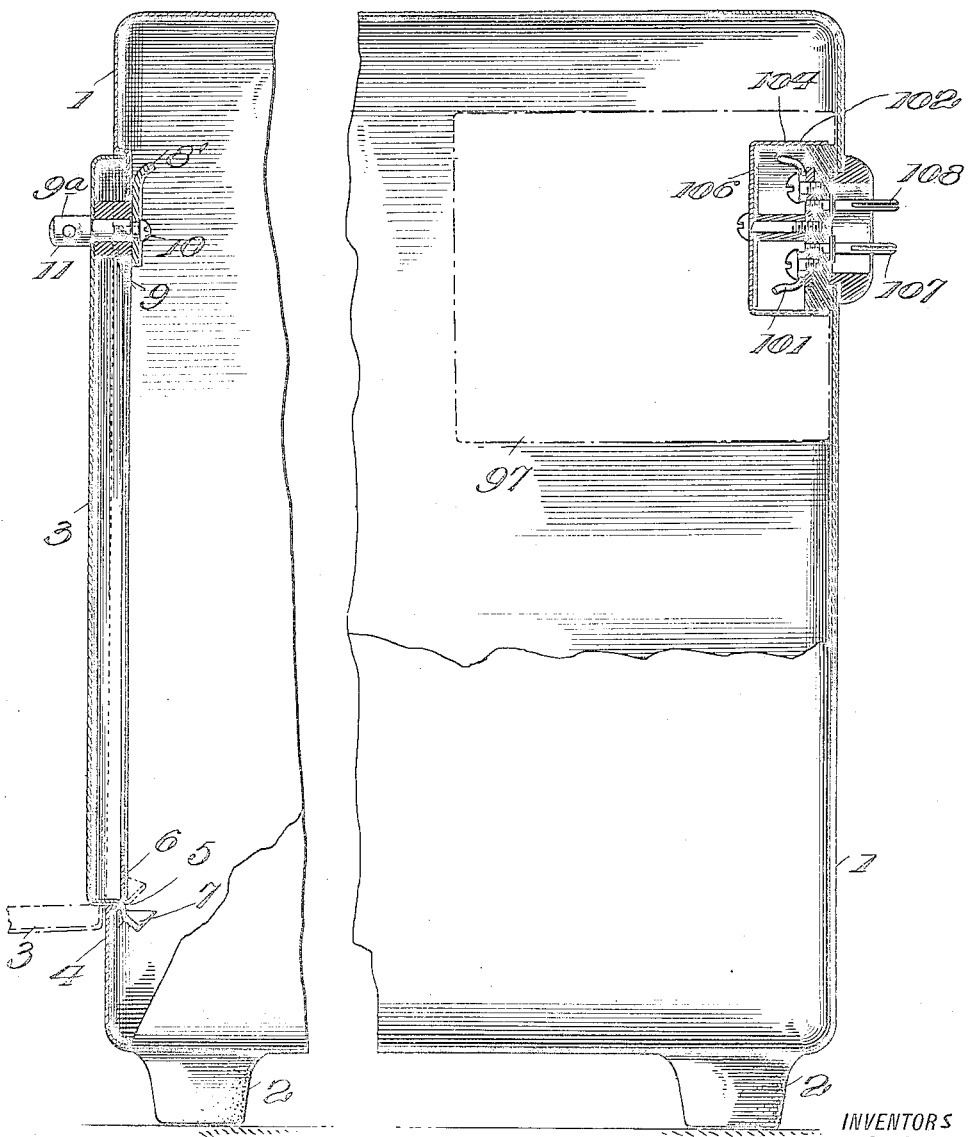

UNITED STATES PATENT OFFICE.

FRANK L. CAPPS AND JOHN J. SCULLY, OF BRIDGEPORT, CONNECTICUT, ASSIGNORS TO AMERICAN GRAPHOPHONE COMPANY, OF BRIDGEPORT, CONNECTICUT, A CORPORATION OF WEST VIRGINIA.

SHAVING-MACHINE FOR SOUND-RECORD TABLETS.

1,227,748.　　　　Specification of Letters Patent.　　Patented May 29, 1917.

Application filed October 14, 1915.　Serial No. 55,913.

*To all whom it may concern:*

Be it known that we, FRANK L. CAPPS and JOHN J. SCULLY, citizens of the United States of America, and residents of Bridgeport, Connecticut, have invented a new and useful Improvement in Shaving-Machines for Sound-Record Tablets, which invention is fully set forth in the following specification.

This invention relates to talking machines, and more particularly to machines designed for shaving off the surfaces of record tablets used in such machines in order to present a smooth and properly prepared surface for receiving the record. The record tablets employed in talking machines used for recording sound are generally of wax or wax-like material, and the record is cut or engraved therein. It is necessary that the surface be smooth and regular. Moreover, in certain classes of machines used for dictation purposes, after the record has been dictated and transcribed, it is the common practice to shave off the record to prepare the tablet for receiving a new record thereon. The present invention is designed for use wherever it is desired to shave a tablet to prepare it for receiving a record, but more particularly it is designed for use in connection with dictaphone machines for shaving off a transcribed record and preparing the tablet for reuse as indicated above.

With this object in view, the invention consists, broadly stated, of a motor, preferably mounted in a suitable box or casing, operatively connected to a carriage moving horizontally on a suitable guide or way located above the casing, the movement of the carriage being parallel with the surface of a revolving cylindrical tablet also driven by said motor. The carriage supports a suitable shaving knife in operative relation to the surface of the record tablet, and automatic means are provided whereby the carriage, when it has reached the end of the record tablet and finished one cut, automatically shuts off the power (as an electric current) from the motor, the power being again automatically switched on as the carriage is returned to position to take a new cut; and also after the termination of a cut upon the record the knife is automatically advanced a sufficient distance to cause it to take a new cut or shaving from the tablet. The mechanism by which this advance of the knife is accomplished is also capable of manual operation, to the end that the knife may be initially adjusted to take the first cut, after which the adjustments are automatic.

For the purpose of removing chips or shavings and preventing the annoying accumulations thereof upon the machine and the clogging of parts of the mechanism, automatic means are provided for withdrawing shavings, as they leave the knife, by a suction device operated by the motor, the shavings being removed to a suitable closed receptacle within the motor box or casing. This receptacle may be removed to empty the accumulation of shavings.

The inventive idea involved is capable of receiving a variety of mechanical expressions, two of which, for the purpose of illustrating the invention. are shown in the accompanying drawings, but it is to be expressly understood that such drawings are for the purpose of illustration only and are not designed to define the limitations of the invention, reference being had to the appended claims for this purpose.

In said drawings,

Fig. 4 is a bottom plan view of the carriage;

Fig. 5 is a perspective view of the shaving knife and parts operatively connected therewith to automatically operate the same, the parts being shown separated or drawn apart to facilitate clear illustration;

Fig. 6 is a perspective view of the pinion which acts to advance the knife, together with the sleeve or bearing therefor;

Fig. 7 is a perspective view of a cam forming one of the detailed parts of the actuating mechanism for the knife;

Fig. 8 is a front elevation of the carriage and the switch mechanism controlling the motor;

Fig. 9 is a sectional view showing the means for actuating the pawl for advancing the knife;

Fig. 10 is a detail perspective of the switch lever;

Fig. 11 is a fragmentary plan view of another embodiment of the invention, the view showing the shaving knife and the parts operatively connected therewith to operate the same;

Fig. 12 is an end view, partly in section, of the parts shown in Fig. 11;

Fig. 13 is a perspective view of some of the parts shown in Figs. 11 and 12, these being shown separated or drawn apart to facilitate clear illustration;

Fig. 14 is a perspective view of the motor receiving box or casing with the side door thereof open and the box or casing inclosing the resistance device in position;

Fig. 15 is a detail perspective of the catch for the door to the motor casing;

Fig. 16 is a broken sectional detail showing the door of the box or casing closed; and Fig. 17 is a sectional detail showing some of the electrical connections.

Figure 1:
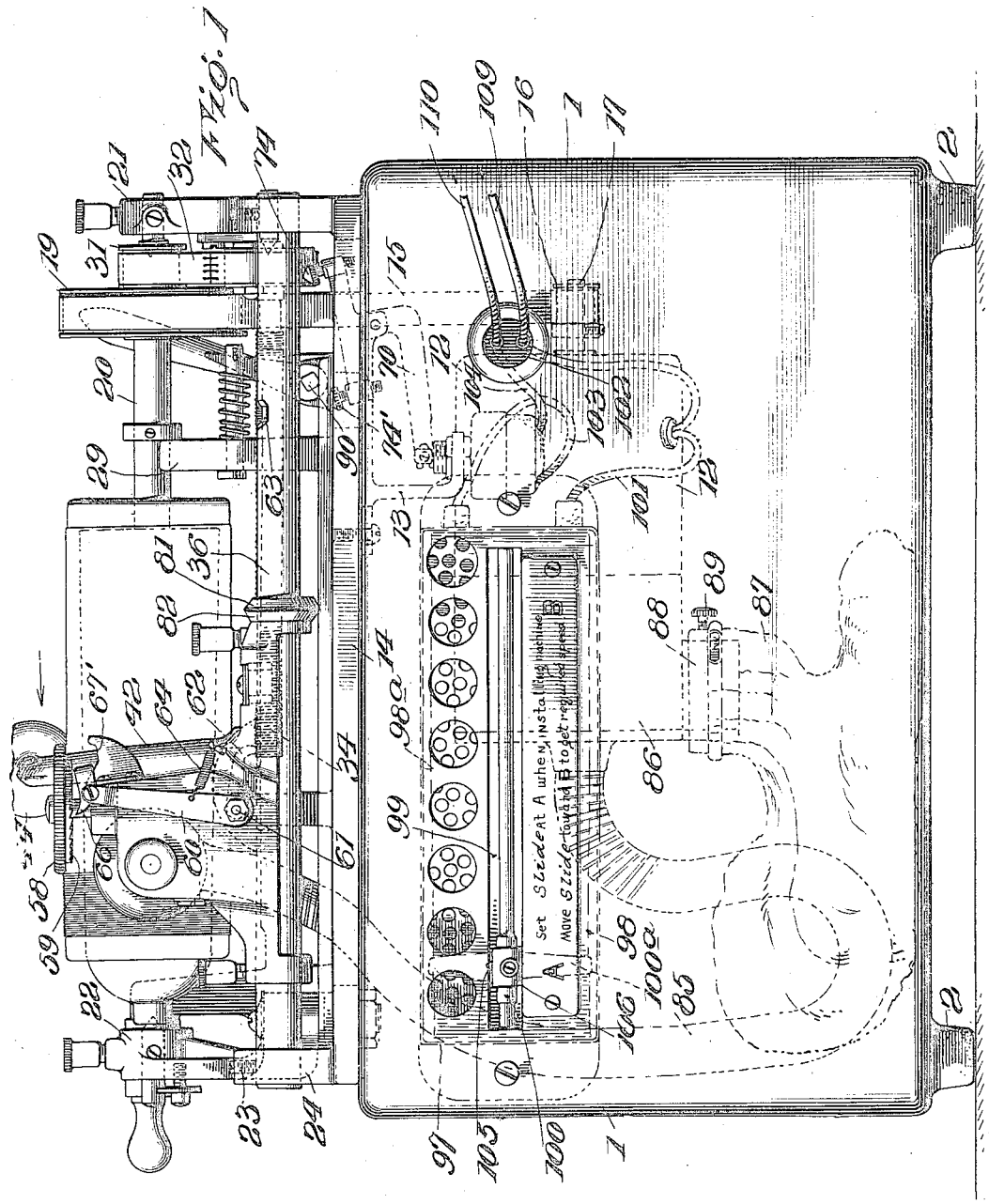
Figure 1 is a rear elevation of a shaving machine embodying the invention.

Referring to the drawings, in which like reference numerals indicate like parts throughout the several views, 1 indicates a suitable box or casing preferably mounted upon suitable buffer feet or supports 2 and provided with a door 3 preferably hinged at its bottom edge to an opening in the side of the casing.

Preferably the casing and door are composed of sheet metal, and the door is hinged to the casing through the medium of a plurality of ears or tongues 4 projecting from the lower edge of the door through suitable slots 5 (see Fig. 16) formed in an inwardly extending flange portion 6 in the wall of the casing, the ears 4 having an upturned triangularly shaped lobe 7 which acts as a stop to limit the opening movement of the door, preferably to a horizontal position. The door is retained in closed position by means of a catch 8 (Figs. 14, 15 and 16), consisting of a piece of spring metal, shaped as shown in Fig. 15, having a tongue 8' which engages the downwardly extended rabbeted flange on the casing when the door is closed and the latch is in engaging position. For the purpose of exerting spring tension upon the catch to hold the door snugly closed, the catch 8 has spring arms 8'' and 8''' reacting against the inner face of the door 3. The catch 8 is secured to the inner face of the door by means of a sleeve 9 and a pin 9ª extending through the door, through the sleeve and through a central opening in the catch, the parts being bound together by a screw 10, as will be readily seen from an inspection of Figs. 14 and 16. The part 9ª is provided with any suitable means, such as a transverse bar 11, by means of which the catch may be turned to engage and disengage the flange.

Figure 2:
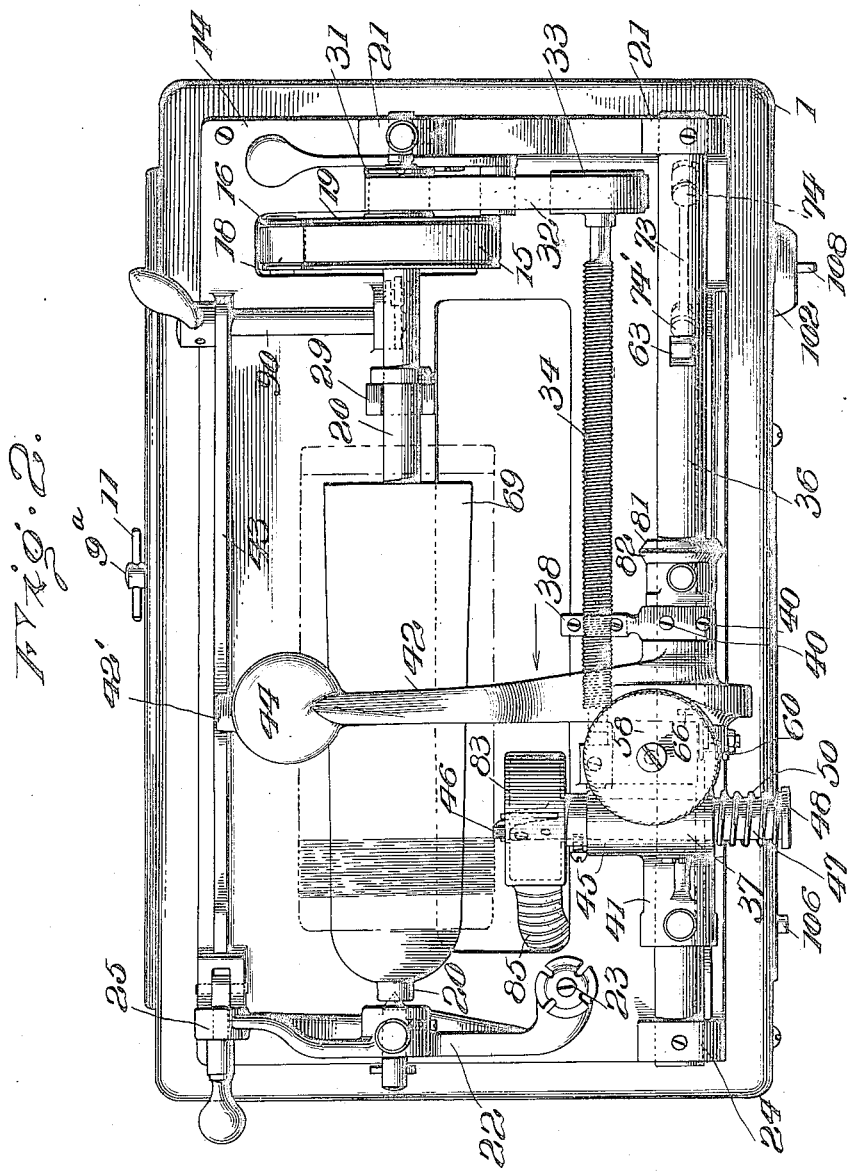
Fig. 2 is a top plan view thereof.
Figure 3:
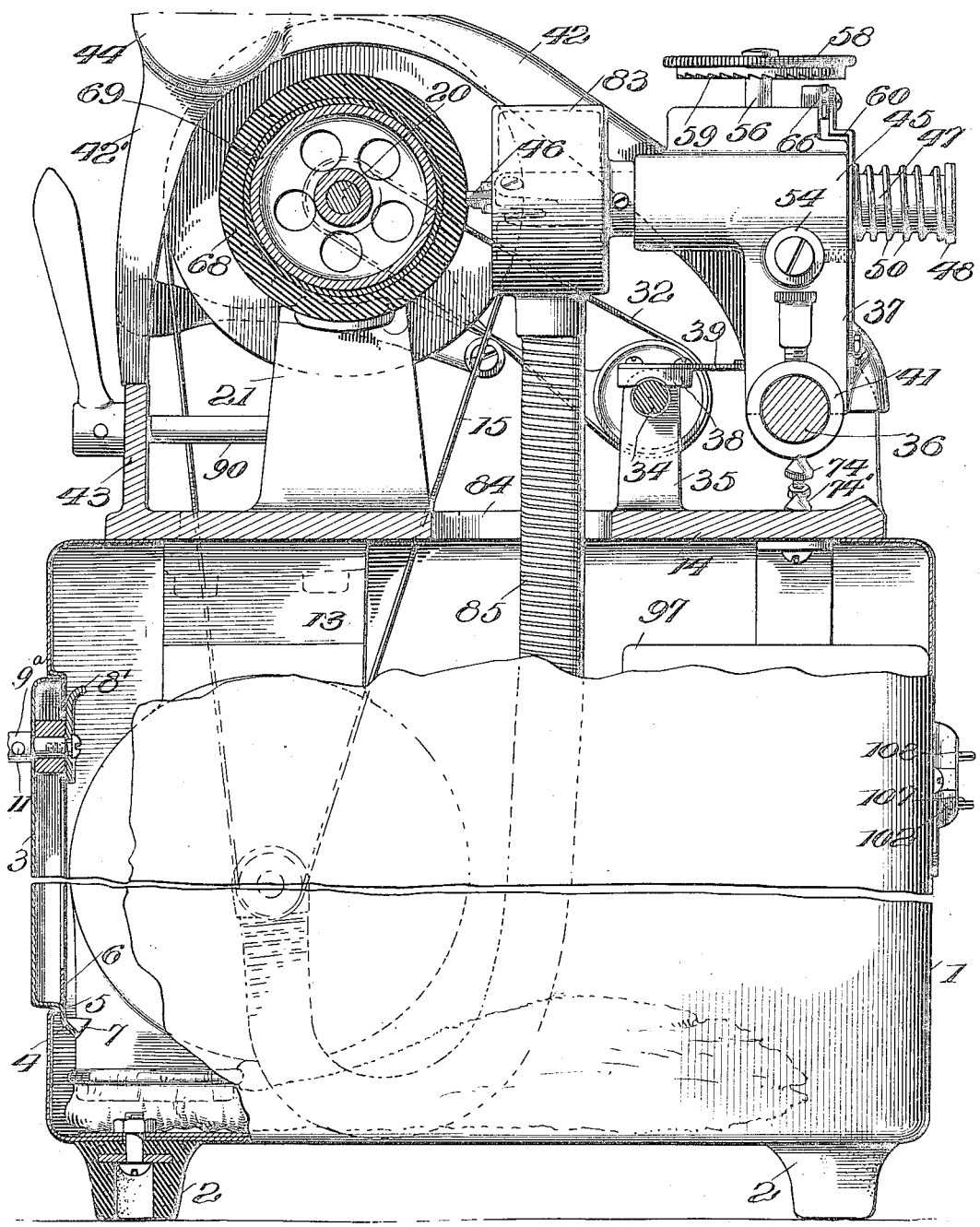
Fig. 3 is an end elevation, parts being shown in section.

As is common with machines of the class to which this invention relates, there is mounted within the casing 1 a suitable motor 12, preferably an electric motor, shown in dotted lines in Fig. 1, the same being supported on a bracket 13 bolted to a plate 14 forming the top of the box or casing and also the supporting platform for the shaving machine proper. A suitable driving belt or cord 15 passes over a drive pulley 16 on the motor shaft 17 and extends upward through an opening 18 (Fig. 2) in the plate 14, and passes over a driving pulley 19 on the mandrel shaft 20, which shaft has bearings in brackets 21 and 29, shown on the right hand side of Fig. 1, and on an end gate 22 pivotally supported at 23 on an upwardly extending bracket 24 at the left hand side of Fig. 1, said gate being provided with a suitable catch 25 (Fig. 2) for retaining it in its closed position. On the shaft 20, adjacent to the pulley 18, is a second pulley 31, over which passes a belt 32 said belt passing around a pulley 33 on a feed screw shaft 34, having bearings in suitable brackets 35, one of which is shown in Fig. 3 projecting upward from the plate 14. Supported in suitable brackets mounted on the opopsite ends of the plate 14, and parallel with the feed screw 34, is a rod 36 forming the guide or way upon which the knife supporting carriage 37 travels, the carriage being operatively connected to the feed screw by a half-nut 38 carried on an arm 39 secured to the carriage as by screws 40—40 (Fig. 2).

The carriage is in the form of a casting having a sleeve 41 and preferably having the lower middle portion thereof cut away, and its ends embracing the guide or way 36 so that the carriage is free to move or slide upon the guide or way 36, or may be turned around the said guide or way to throw the parts into and out of operative position. Projecting from the carriage, upward and over the record tablet is a curved arm 42 having a downwardly projecting leg 42' which rests upon a longitudinally extending rail 43 on the plate 14, said arm 42 being preferably provided with an enlargement 44 to provide the necessary mass or weight to hold the knife down to its work, as will be understood from further description. Extending upward from the sleeve 41 is a portion 45 of the casting serving as the support for the knife and the automatic advancing mechanism therefor. Referring to Fig. 5, the knife 46 is preferably in the form of a sapphire blade securely mounted on one end of a bar 47 which, in accordance with my invention, is preferably cylindrical as shown and provided with a flanged head 48 on the end opposite the knife and with a rack 49 on the underside thereof. This bar 47 is mounted in a horizontal bore in the casting 45, as will be understood by an inspection of Fig. 3, with a spring 50 reacting between the head 48 on the bar and the face of the casting 45, the spring having a tendency to withdraw or retract the bar and shaving blade from the cylinder. Mounted in a bore formed in the casting 45 immediately under the bar 47 and transversely thereof is a pinion 51 engaging the rack 49 on the bar. This pinion is preferably formed integrally with a shaft 52, and has a worm gear 53 on one end thereof and preferably also integral therewith. The shaft 51 passes through a bearing sleeve 54 located in the transverse bore within the casting 45, which sleeve has its upper portion cut away, as at 55 (Figs. 5 and 6), so as to permit the upper portion of the pinion 51 to engage the rack 49 on the bar 47.

Mounted in bearings in the casting 45 is a vertical shaft 56 having formed on its lower end a worm 57, (Fig. 6), engaging the worm gear 53 on the shaft 52. This shaft 56 has secured on its upper end a disk 58 having a ratchet 59 on the under side of the periphery thereof. The disk 58 is preferably burred or knurled on its periphery to facilitate turning the same by hand, and it will be readily understood that, by turning the disk 58 in one direction, the pinion 51 will be caused to advance the knife to the left, and by turning it in the other direction, it will withdraw the knife to the right, by which means the position of the knife with relation to the surface of the record-tablet may be initially adjusted.

For the purpose of effecting the automatic advancement of the knife at the close of one cut, into position to take the next succeeding cut on the tablet, means are provided for imparting a step-by-step turning movement to the disk 58 at the end of each cut. As shown in Figs. 1 to 9, the said means consist of a lever 60 rigidly secured at its lower end to a rock-shaft 61 mounted to rock in bearings on the carriage, extending transversely to the guide or way 36 and just above the same. Rigidly secured to the opposite end of the shaft 61 from the lever 60 is an arm or lever 62, having a downwardly extending end or nose riding upon the upper surface of the guide or way 36 during the shaving operation. Located in the upper surface of said guide or way is a depression 63 (Figs. 1, 2 and 9) into which the nose of the lever 62 falls when the knife has reached the extreme end of the cut, this action being insured by a suitable spring 64 secured to the lever 60 at one end and to the casting of the carriage at the other end. To facilitate the entrance and exit of the nose of the lever 62 into the depression 63, the end walls of said depression are preferably formed on an incline or cam, as will be readily understood from an inspection of Fig. 1. Referring to Fig. 1, it will be seen that the lever 60 is rocked to the right when the nose of the lever 62 enters the depression 63 and is rocked to the left when said lever is withdrawn from said depression. For the purpose of enabling the nose of the lever 62 to contact with the upper surface of the guide or way 36, a slot 65 (see Fig. 4) is formed in the sleeve through which slot the lever 62 extends into contact with the guide or way 36.

Pivotally mounted upon the upper end of the lever 60 is a pawl 66 whose opposite end 67 serves as a weight tending to throw the pawl 66 into engagement with the ratchet 59 on the disk 58, and yet yielding when the lever 60 is thrown to the right, so as to permit the pawl to ride over the ratchet teeth while incidentally throwing the nose of the lever into engagement with said ratchet teeth, as will be readily understood. When the nose of the lever 62 falls into the depression 63, the lever 60 is thrown to the right and the pawl 66 is withdrawn to the right to engage another tooth of the ratchet 59, and when the carriage is advanced from right to left, the lever 60 is likewise rocked from right to left, imparting a slight turning movement to the shaft 56 and thereby slightly advancing the knife 46 just sufficient to position it for taking another thin shaving from the surface of the record tablet 68 mounted on the mandrel 69. For the purpose of elevating the weighted end 67 and depressing the pawl 66, when the lever 60 moves from left to right, a cam surface 67' (Figs. 7 and 8) is arranged in the path of the weighted end 67, this cam surface being here shown as formed on a bracket arm secured to the casting of the carriage. When the lever 60 moves from right to left, the weighted end 67 descends along the surface of the cam 67' and the nose of the pawl 66 is again thrown into operative engagement with the ratchet 59. Continued movement of the lever in the same direction again causes the weighted end of the pawl to be raised and the nose of the pawl to be disengaged from the ratchet teeth. With this construction, the pawl is disengaged from the teeth at the ends of its path of reciprocation, thus making it possible for the wheel 58 to be freely turned manually in either direction.

In Figs. 11, 12 and 13, we have shown another form of the mechanism for adjusting the knife, this form being, in fact, preferable in many cases.

The knife 46ª is carried by a bar 47ª provided with a rack 49ª on its lower side. A spring 50ª reacts against a head 48ª on the bar and against the casting 45 in which the bar is mounted and serves to press the bar outwardly, thus normally tending to withdraw the knife from the record. The rack 49ª is engaged by a pinion 51ª on a shaft 52ª carrying a worm-gear 53ª. The worm-gear meshes with a worm 57ª on a vertical shaft 56ª. All of the parts last above described are similar to those previously described, and are similarly mounted in the casting 45.

At the upper end of the vertical shaft 56ª is a hand-wheel 58ª, by means of which the shaft can be manually turned at will to adjust the knife by means of the gearing that has been described. The shaft 56ª carries a series of ratchet teeth which are preferably formed on a wheel 59ª secured to the shaft below the said hand-wheel 58ª.

Mounted on the casting 45 is a lever 60ª pivoted between its ends for movement about an axis at 61ª which is parallel to the guide 36. Vertically pivoted to the upper end of the lever 60ª is a pawl 66ª having a pointed end adapted to engage the ratchet teeth on the wheel 59ª. As clearly shown in Fig. 12, lever 60ª carries a pin or bar 66ᵇ, and a coiled tension spring 66ᶜ connects the free end of this pin or bar with a depending finger 66ᵈ on the pawl, thus tending to hold the pawl in engagement with the ratchet teeth. It will be seen that, when the lever is oscillated about its pivot, the pawl will engage the ratchet teeth and turn the wheel 59ª to effect the adjustment of the knife. A spring 64ª serves to automatically retract the lever to move the pawl in its inoperative direction.

The guide 36 is provided near one end with a notch 63ª, the bottom of the notch extending entirely across the guide, as clearly shown in Figs. 11 and 12. The notch varies in depth at one end, its bottom being inclined outward to the periphery of the guide to form a cam surface.

When the carriage is moved along the guide by the mechanism that has been described, the lower end of the lever 60ª is forced into the notch 63ª by means of the spring 64ª. Fig. 12 clearly shows the lever with its lower end in the notch. The notch is so positioned that the lever will reach the deepest part thereof at or near the completion of the cut on the record. It will be seen that movement of the carriage in the reverse direction toward the initial end of the record will cause the lever to engage the cam surface of the notch and be forced outward, its upper end carrying the pawl in the direction to turn the wheel 59ª. However, as had already been stated, the carriage is not moved directly back along the guide, but is first swung about the guide to a greater or less extent. From Fig. 12, it will be obvious that this upward swinging of the carriage is equally effective to swing the lever. When the carriage is swung upward, the shoulder at the upper edge of the notch will engage the lever and move it outward to a greater or less extent, depending upon the extent of upward swing of the carriage. It is therefore clear that any movement of the carriage out of the position which it has at the end of the cut will swing the lever to advance the knife. In order that the shaft 56ª may be normally free for manual turning, we preferably provide a cam 67ª adjacent the pawl and adapted to engage the aforesaid finger 66ᵈ on the pawl. The cam 67ª is provided with a notch 67ᵇ and, when the pawl is reciprocated, the spring 66ᶜ moves the finger into the notch. From Fig. 11, it will be clear that the cam holds the pawl out of engagement with the ratchet teeth at the ends of its path of reciprocation and that, at the center of its path, when the finger is in the notch, the pawl engages the teeth to turn the wheel. With the lower end of the lever 60ª engaging the periphery of the guide, or fully entered into the notch, the ratchet teeth will be disengaged by the pawl and manual adjustment by means of the wheel 58ª can be effected. Thus the knife may be manually adjusted to a position for taking off of the tablet a first rough-cut, whereupon, by movement of the carriage to initial position, the knife will be automatically advanced a slight distance sufficient to take the final finishing cut.

Preferably, as shown in Figs. 11 and 12, a guard 59ᵇ is mounted on the carriage to partly inclose the wheel carrying the teeth 59ª. The shaft 56ª extends through an aperture in the top of the guard, and the hand-wheel 58ª is mounted above the guard.

Means is provided for automatically stopping the operation of the mandrel and of the carriage-moving means at the end of each cut, and for starting the operation when the carriage is returned to position for taking another cut. Preferably, the parts are stopped by stopping the driving motor, and, when the motor is an electric motor as here shown and described, it is stopped by opening a suitable switch.

Referring to Figs. 1, 8 and 10, 70 is a bent lever pivoted at 71 in downwardly depending ears 72 on the bracket 13, which lever has a T-bar 73 on its upper end. At each end of the T-bar are mounted upwardly projecting conical cam surfaces 74—74′, preferably formed on the heads of pins which are adjustably mounted in the T-bar by being screw-threaded therein and provided with lock nuts 75—75 for securing them in adjusted position. This T-bar 73 is located in a slot 76 in the plate 14, and at the extreme right hand end thereof. On the other arm of the lever 70 there is formed a slot 77 (Fig. 10) which engages a pin 78 on the plunger 79 of a suitable switch 80 carried by the bracket 13. When the plunger 79 is raised, the switch is opened and when the plunger 79 is depressed, the switch is closed.

Formed on the right hand end of the carriage sleeve 41 is a pair of reversely inclined annular cam surfaces 81 and 82, and the cones 74—74′ are in a position to be engaged by the cam surfaces 81 and 82 during the sliding movement of the carriage. As the carriage reaches a position near its right hand limit of travel, the cam 81 engages the cone 74 and rocks the lever 70 into the position shown in Fig. 8, thereby opening the switch and stopping the motor. When the carriage is returned to the left to take a new cut, the cam surface 82 engages the other cone 74′ and rocks the lever 70 into position shown in Fig. 1, thereby closing the switch and starting the motor. It will be clear that the operation of the switch does not limit or interfere with the movement of the carriage in either direction. The carriage after engaging one of the cones is free to continue its movement under the force of the inertia of the motor and other rotating parts.

For the purpose of automatically removing the chips or shavings, a suction box 83 (Fig. 3) is mounted adjacent to the knife with an open face toward the tablet, and extending downward through an opening 84 in the plate 14 is a flexible tube 85, leading from the box 83 to a fan 86 (Fig. 1) which withdraws the shavings from the end of the tube and deposits them in a receptacle, here shown in the form of a bag 87, which is preferably porous and is removably secured to the bottom of the fan as by means of a clamping ring 88 and a set-screw 89.

For the purpose of removing the shaved tablet from the mandrel, a suitable tablet ejector mechanism 90 is provided, which serves to loosen the tablet from the mandrel and, the gate 22 being open, the tablet is then removed by hand. This ejector mechanism of itself constitutes no part of this invention, and will not be described in detail.

Referring to Fig. 14, 97 is a box or casing mounted on the interior of the main frame or casing 1 and inclosing the means employed for controlling the resistance for the current flowing to the motor. This casing is also shown in dotted lines in Figs. 1 and 17. Inside the casing 97 is an inclosure 97$^a$, preferably made of sheet metal and perforated as shown in Figs. 1 and 14. Inside the inclosure 97$^a$ are two parallel horizontal resistance coils 98 and 98$^a$, connected respectively to the wires 101 and 103. Between the coils in the back wall of the casing 1 is a slot 99 (Fig. 1). Slidably mounted in the slot 99 is a member 100 which carries a connecting clip 100$^a$ slidably engaging and electrically connected to the two coils. The clip 100$^a$ is electrically insulated from the carrier member 100. The wires 101 and 103, together with other suitable wires, such as 104, connect the coils with the socket 102, the motor 12 and the switch 80. By adjusting the sliding member 100 in the slot 99, the clip 100$^a$ may be moved along the coils and the resistance may be increased or decreased at will, thereby varying the speed of the motor, and consequently the speed at which the record tablet is driven. Preferably a pointer 105 is associated with the sliding member 100, which member is manipulated by means of a hand-hold 106 of electrical insulating material. A suitable scale may be, and preferably is, associated with the pointer 105 whereby the desired speed may be indicated.

The socket 102 for the electrical connections may be of any suitable form and, as here shown, it consists of two binding posts for the wires 101 and 104 suitably inclosed in a casing 106, which binding posts are in electrical connection with the circuit plugs 107 and 108, respectively, for reception of the sockets on the usual plug carrying the main current wires 109 and 110.

While the construction of the device has been herein described with considerable detail and particularity, it will be understood that the invention is not limited to the specific and detailed construction thus described; and, furtherfore, it will be understood that certain parts or sub-combinations of the mechanism may be employed in the absence of other parts or combinations. All such variations from the specific construction shown and described, and such sub-combinations, are within the purview of the invention, the limits of which are to be determined by the appended claims rather than by the specific construction herein set forth.

What is claimed is:—

1. In a machine for shaving sound-record tablets, the combination of a tablet-carrying mandrel, a carriage movable along a tablet on the mandrel from one end to the other, a knife on the carriage, and knife-advancing means automatically operable on the termination of each cut by a longitudinal movement of the carriage.

2. In a machine for shaving sound-record tablets, the combination of a tablet-carrying mandrel, a carriage movable along a tablet on the mandrel and capable of being lifted away therefrom, a knife on the carriage, and knife-advancing means automatically operable by a lifting movement of the carriage.

3. In a machine for shaving sound-record tablets, the combination of a tablet-carrying mandrel, a carriage movable along a tablet on the mandrel and capable of being lifted away therefrom, a knife on the carriage, and knife-advancing means automatically operable by a lifting movement of the carriage or by a longitudinal movement thereof.

4. In a machine for shaving sound-record tablets, the combination of a tablet-carrying mandrel, a carriage, a guide or way for said carriage on which the carriage is capable of both longitudinal movement and turning movement, a knife supported on the carriage, mechanism for adjusting the knife with relation to a tablet on the mandrel, and means operable on the termination of each cut to actuate said mechanism when the carriage is turned about said guide or way.

5. In a machine for shaving sound-record tablets, the combination of a tablet-carrying mandrel, a carriage, a guide or way for said carriage on which the carriage is capable of both longitudinal movement and turning movement, a knife supported on the carriage, mechanism for adjusting the knife with relation to a tablet on the mandrel, and means operable on the termination of each cut to actuate said mechanism upon longitudinal movement of the carriage on said guide or way.

6. In a machine for shaving sound-record tablets, the combination of a tablet-carrying mandrel, a carriage, a guide or way for said carriage on which the carriage is capable of both longitudinal movement and turning movement, a knife supported on the carriage, mechanism for adjusting the knife with relation to a tablet on the mandrel, and means operable on the termination of each cut to actuate said mechanism upon longitudinal movement of the carriage on said guide or way or upon turning movement of the carriage on said guide or way.

7. In a machine for shaving sound-record tablets, the combination of a tablet-carrying mandrel, a carriage movable along a tablet on the mandrel, a knife movably mounted on the carriage, and worm-gear mechanism mounted on the carriage and connected with the knife for moving the latter toward or from the tablet.

8. In a machine for shaving sound-record tablets, the combination of a tablet-carrying mandrel, a carriage movable along a tablet on the mandrel, a knife movably mounted on the carriage, and mechanism mounted on the carriage and connected with the knife for moving the latter toward or from the tablet, the said mechanism comprising a rack rigidly connected to the knife, a rotatable pinion engaging the rack, and means for turning the pinion.

9. In a machine for shaving sound-record tablets, the combination of a tablet-carrying mandrel, a carriage movable along a tablet on the mandrel, a knife movably mounted on the carriage, and mechanism mounted on the carriage and connected with the knife for moving the latter toward or from the record, the said mechanism comprising a rack rigidly connected to the knife, a rotatable pinion engaging the rack, a worm-wheel rotatable with the pinion, a worm engaging the worm-wheel, and a device for turning the worm.

10. In a machine for shaving sound-record tablets, the combination of a tablet-carrying mandrel, a carriage movable along the tablet on the mandrel, a knife movably mounted on the carriage, and mechanism mounted on the carriage and connected with the knife for moving the latter toward or from the tablet, the said mechanism comprising a rack rigidly connected to the knife, a rotatable pinion engaging the rack and means automatically operable by movement of the carriage for turning said pinion.

11. In a machine for shaving sound-record tablets, the combination of a tablet-carrying mandrel, a carriage movable along the tablet on the mandrel, a knife movably mounted on the carriage, and mechanism mounted on the carriage and connected with the knife for moving the latter toward or from the record, the said mechanism comprising a rack rigidly connected to the knife, a rotatable pinion engaging the rack, a worm-wheel rotatable with the pinion, a worm engaging the worm-wheel and means automatically operable by movement of the carriage for turning said worm.

12. In a machine for shaving sound-record tablets, the combination of a tablet-carrying mandrel, a carriage movable along a tablet on the mandrel, a knife mounted on the carriage, mechanism comprising a manually operable rotatable shaft for adjusting the knife with relation to the tablet, worm-gear mechanism for rotating said shaft and means automatically operable by a movement of the carriage for actuating said worm-gear mechanism.

13. In a machine for shaving sound-record tablets, the combination of a tablet-carrying mandrel, a carriage, a guide or way for said carriage, a knife supported on the carriage, and a lever fulcrumed on the carriage and operatively connected to said knife, one arm of said lever being in a position to operatively contact with lever operating depression in said guide or way to rock the lever upon movement of the carriage after completion of each cut.

14. In a machine for shaving sound-record tablets, the combination of a tablet-carrying mandrel, a carriage movable along a tablet on the mandrel, a knife mounted on the carriage, mechanism comprising worm-gear mechanism for adjusting the knife with relation to the tablet, a rotatable wheel for actuating said worm-gear mechanism, ratchet teeth on the wheel, a reciprocating pawl adapted to engage the teeth to turn the wheel, and a pawl-actuating device automatically operable by a movement of the carriage.

15. In a machine for shaving sound-record tablets, the combination of a tablet-carrying mandrel, a carriage movable along a tablet on the mandrel, a guide or way for said carriage, a knife mounted on the carriage, mechanism comprising a rotatable wheel for adjusting the knife with relation to the tablet, ratchet teeth on the wheel, a reciprocating pawl adapted to engage the teeth to turn the wheel, and a pawl-actuating device coacting with camming means on said guide or way and automatically operable by a movement of the carriage.

16. In a machine for shaving sound-record tablets, the combination of a tablet-carrying mandrel, a carriage movable along a tablet on the mandrel, a knife on the carriage, mechanism comprising a rotatable shaft for adjusting the knife with relation to the tablet, ratchet teeth carried by the shaft, a reciprocating pawl adapted to engage the teeth to turn the shaft, a pawl-actuating device automatically operable by a movement of the carriage, and means for normally holding the pawl out of engagement with the teeth, thereby leaving the shaft free to be turned manually in either direction.

17. In a machine for shaving sound-record tablets, the combination of a tablet-carrying mandrel, a carriage movable along a tablet on the mandrel, a knife on the carriage, mechanism comprising a rotatable shaft for adjusting the knife with relation to the tablet, ratchet teeth carried by the shaft, a reciprocating pawl adapted to engage the teeth to turn the shaft, a pawl-actuating device automatically operable by a movement of the carriage, and means for holding the pawl out of engagement with the teeth when at the end of its path of reciprocation, thereby leaving the shaft free to be turned manually in either direction.

18. In a machine for shaving sound-record tablets, the combination of a tablet-carrying mandrel, a carriage movable along a tablet on the mandrel, a knife on the carriage, mechanism comprising a rotatable shaft for adjusting the knife with relation to the tablet, ratchet teeth carried by the shaft, a reciprocating pawl adapted to engage the teeth to turn the shaft, a pawl-actuating device automatically operable by a movement of the carriage, and a cam in the path of the pawl permitting it to engage the teeth during the central part of its path of reciprocation and forcing it out of engagement therewith at the ends of its path of reciprocation, thereby leaving the shaft free to be turned manually in either direction.

19. In a machine for shaving sound-record tablets, the combination of a tablet-carrying mandrel, a carriage movable along a tablet on the mandrel, a knife movably mounted on the carriage, and mechanism for automatically moving the knife relatively to the carriage toward the tablet comprising a lever pivoted on the carriage about an axis substantially parallel to the mandrel and an abutment fixed against movement with the carriage.

20. In a machine for shaving sound-record tablets, the combination of a tablet-carrying mandrel, a carriage movable along a tablet on the mandrel, a knife movably mounted on the carriage, and mechanism for automatically moving the knife relatively to the carriage toward the tablet comprising a lever pivoted on the carriage about an axis substantially parallel to the mandrel and a cam fixed against movement with the carriage.

21. In a machine for shaving sound-record tablets, the combination of a tablet-carrying mandrel, a carriage movable along a tablet on the mandrel, a knife movably mounted on the carriage, a mechanism for moving the knife relatively to the carriage toward the tablet comprising a rotatable shaft on the carriage, ratchet teeth carried by the shaft, a reciprocating pawl adapted to engage the teeth to turn the shaft, a pawl-actuating lever pivoted on the carriage about an axis substantially parallel to the mandrel, and a fixed abutment for engaging the lever.

22. In a machine for shaving sound-record tablets, the combination of a tablet-carrying mandrel, a knife-supporting carriage, a knife movably mounted on the carriage, a mechanism for moving the knife relatively to the carriage toward the tablet comprising a movable device on the carriage, and a guide for the carriage on which it is movable longitudinally, the said guide having a part provided with a surface adapted to engage and actuate the said movable device on the carriage when the carriage is moved.

23. In a machine for shaving sound-record tablets, the combination of a tablet-carrying mandrel, a knife-supporting carriage, a guide for the carriage on which it is movable longitudinally, the guide having a notch therein, a knife movably mounted on the carriage, and a mechanism for moving the knife relatively to the carriage toward the tablet comprising a device on the carriage automatically movable into the notch of the guide.

24. In a machine for shaving sound-record tablets, the combination of a tablet-carrying mandrel, a knife-supporting carriage, a guide for the carriage on which it is movable longitudinally, the guide having a notch therein, a knife movably mounted on the carriage, and a mechanism for moving the knife relatively to the carriage toward the tablet comprising a rotatable shaft on the carriage, ratchet teeth carried by the shaft, a reciprocating pawl adapted to engage the teeth to turn the wheel, and a pawl-actuating lever on the carriage having a part automatically movable into the said notch of the guide.

25. In a machine for shaving sound-record tablets, the combination of a tablet-carrying mandrel, a knife-supporting carriage, a guide for the carriage on which it is movable longitudinally, the guide having at one side a notch with one end beveled, a knife movably mounted on the carriage, and a mechanism for moving the knife relatively to the carriage toward the tablet comprising a device on the carriage automatically movable transversely into the notch of the guide and adapted to be forced outward by the beveled side of the notch when the carriage is moved, thereby moving the knife.

26. In a machine for shaving sound-record tablets, the combination of a tablet-carrying mandrel, a knife-supporting carriage, a guide for the carriage on which it is movable longitudinally, the guide having a notch therein, a knife movably mounted on the carriage, and a mechanism for moving the knife relatively to the carriage toward the tablet comprising a device on the carriage automatically movable into the notch of the guide and adapted to be forced outward when the carriage is moved longitudinally along the guide.

27. In a machine for shaving sound-record tablets, the combination of a tablet-carrying mandrel, a knife-supporting carriage, a guide for the carriage on which it is movable angularly, the guide having a notch therein, a knife movably mounted on the carriage, a mechanism for moving the knife relatively to the carriage toward the tablet comprising a device on the carriage automatically movable into the notch of the guide and adapted to be forced outward when the carriage is moved angularly on the guide.

28. In a machine for shaving sound-record tablets, the combination of a tablet-carrying mandrel, a knife-supporting carriage, a guide for the carriage on which it is movable longitudinally or angularly, the guide having a notch therein, a knife movably mounted on the carriage, and a mechanism for moving the knife relatively to the carriage toward the tablet comprising a device on the carriage automatically movable into the notch of the guide and adapted to be forced outward when the carriage is moved angularly or is moved longitudinally on the guide.

29. In a machine for shaving sound-record tablets, the combination of a tablet-carrying mandrel, a carriage, a guide or way for said carriage on which the carriage has both longitudinal and turning movement, a cam and a shoulder on said guide or way, mechanism for advancing the knife a predetermined distance after the termination of each cut, and means operatively connected with said mechanism and engaging said cam or shoulder by a longitudinal or turning movement respectively of the carriage on said guide or way.

30. In a machine for shaving sound-record tablets, the combination of a tablet-carrying mandrel, a carriage movable along a tablet on the mandrel, a knife carried by the carriage, a suction box supported on the carriage adjacent the knife, a fan fixed against movement with the carriage, and a flexible tube connecting the suction box with the fan.

31. In a machine for shaving sound-record tablets, the combination of a supporting plate, a tablet-carrying mandrel above the plate, a carriage above the plate and movable along a tablet on the mandrel, a knife carried by the carriage, a suction box supported on the carriage adjacent the knife, a fan below the plate fixed against movement with the carriage, and a flexible tube connecting the suction box with the fan, the said plate being provided with a slot for the tube permitting the tube to move with the carriage.

32. In a machine for shaving sound-record tablets, the combination of a tablet-carrying mandrel, a carriage movable along a tablet on the mandrel, a knife carried by the carriage, a suction box supported adjacent the knife, a fan having its suction connected with the suction box, and a porous shavings receptacle connected with the discharge of the fan.

33. In a machine for shaving sound-record tablets, the combination of a tablet-carrying mandrel, a carriage movable along a tablet on the mandrel, a knife carried by the carriage, a suction box supported adjacent the knife, a fan having its suction connected with the suction box, and a porous bag connected with the discharge of the fan to receive shavings.

34. In a machine for shaving sound-record tablets, the combination of a tablet-carrying mandrel, a knife-carrying carriage movable along a tablet on the mandrel, means for moving the carriage, means for driving the mandrel and the carriage moving means, and means automatically operable by the carriage when it reaches a position near the end of the tablet for stopping the mandrel and the carriage moving means, said last-mentioned means being so constructed that the carriage may pass by its stop-operating position.

35. In a machine for shaving sound-record tablets, the combination of a tablet-carrying mandrel, a knife-carrying carriage movable along a tablet on the mandrel, means for moving the carriage, means for driving the mandrel and the carriage moving means, and means comprising coacting cam surfaces automatically operable by the carriage when it reaches a position near the end of the tablet for stopping the mandrel and the carriage moving means and automatically operable by the carriage during its return to initial position for starting the mandrel and the carriage moving means.

36. In a machine for shaving sound-record tablets, the combination of a tablet-carrying mandrel, a knife-carrying carriage movable along a tablet on the mandrel, means for moving the carriage, means for driving the mandrel and the carriage moving means, and means comprising coacting cam surfaces automatically operable by the carriage when it reaches a position near the end of the tablet for stopping the mandrel and the carriage moving means.

37. In a machine for shaving sound-record tablets, the combination of a tablet-carrying mandrel, a knife-carrying carriage movable along a tablet on the mandrel, means for moving the carriage, means for driving the mandrel and the carriage moving means, and means automatically operable by the carriage when it reaches a position near the end of the tablet for stopping the mandrel and the carriage moving means and automatically operable by the carriage during its return to initial position for starting the mandrel and the carriage moving means, said means being so constructed that the carriage may pass by its stop-actuating position.

38. In a machine for shaving sound-record tablets, the combination of a tablet-carrying mandrel, a knife-carrying carriage movable along a tablet on the mandrel, means for moving the carriage, an electric motor for driving the mandrel and the carriage moving means, a switch in the motor circuit, and means comprising coacting cam surfaces automatically operable by the carriage when it reaches a position near the end of the tablet for opening the switch to stop the motor.

39. In a machine for shaving sound-record tablets, the combination of a tablet-carrying mandrel, a knife-carrying carriage movable along a tablet on the mandrel, means for moving the carriage, an electric motor for driving the mandrel and the carriage moving means, and means comprising a switch automatically operable by the carriage when it reaches a position near the end of the tablet for stopping the motor and automatically operable by the carriage during its return to initial position for starting the motor.

40. In a machine for shaving sound-record tablets, the combination of a tablet-carrying mandrel, a knife-carrying carriage movable along a tablet on the mandrel, means for moving the carriage, an electric motor for driving the mandrel and the carriage moving means, a switch in the motor circuit, means comprising a plurality of cams operatively connected with the switch, and cams on the carriage coacting with said first-named cams whereby the switch is automatically operable by the carriage when it reaches a position near the end of the tablet for stopping the motor and automatically operable by the carriage during its return to initial position for starting the motor.

41. In a machine for shaving sound-record tablets, the combination of a tablet-carrying mandrel, a knife-carrying carriage movable along a tablet on the mandrel, means for moving the carriage, an electric motor for driving the mandrel and the carriage moving means, and means comprising a switch automatically operable by the carriage when it reaches a position near the end of the tablet for stopping the motor, said means being so constructed that the carriage may pass by its switch-operating position.

42. In a machine for shaving sound-record tablets, the combination of a tablet-carrying mandrel, a knife-carrying carriage movable along a tablet on the mandrel, means for moving the carriage, an electric motor for driving the mandrel and the carriage moving means, a switch in the motor circuit, and means automatically operable by the carriage when it reaches a position near the end of the tablet for opening the switch to stop the motor.

43. In a machine for shaving sound-record tablets, the combination of a tablet-carrying mandrel, a knife-carrying carriage, a guide for the carriage on which it is movable longitudinally and angularly, means for moving the carriage along the guide, means for driving the mandrel and the carriage moving means, and means automatically operable by the carriage when it reaches a position near the end of the tablet for stopping the mandrel and the carriage moving means and automatically operable by the carriage when it is returned to initial position for starting the mandrel and the carriage moving means, the said stopping and starting means being operable with the carriage in any angular position.

44. In a machine for shaving sound-record tablets, the combination of a tablet-carrying mandrel, a knife-carrying carriage, a guide for the carriage on which it is movable longitudinally and angularly, means for moving the carriage along the guide, means for driving the mandrel and the carriage-moving means, and means automatically operable by the carriage when it reaches a position near the end of the tablet for stopping the mandrel and the carriage-moving means, the said stopping means being operable when the carriage is in any angular position.

45. In a machine for shaving sound-record tablets, the combination of a tablet-carrying mandrel, a knife-carrying carriage movable along a tablet on the mandrel, means for moving the carriage, means for driving the mandrel and the carriage moving means, a pivoted T-lever, a controlling means connected with the body part of the lever for stopping and starting the movement of the mandrel and the carriage moving means, and devices on the arms of the lever for engagement with the carriage to move the lever to bring the controlling means into stopping position when the carriage moves in one direction and into starting position when the carriage moves in the other direction.

46. In a machine for shaving sound-record tablets, the combination of a tablet-carrying mandrel, a knife-carrying carriage movable along a tablet on the mandrel, means for moving the carriage, means for driving the mandrel and the carriage-moving means, a pivoted lever, a controlling means connected with the body part of the lever for stopping the movement of the mandrel and the carriage-moving means, and a device on the lever having a cam surface for engagement with a cam surface on the carriage to bring the controlling means into stopping position, said lever being moved by the coaction of said cam surfaces to a position permitting the passage of the carriage by its stop-controlling position.

47. In a machine for shaving sound-record tablets, the combination of a tablet-carrying mandrel, a knife-carrying carriage, a guide for the carriage on which it is movable longitudinally and angularly, means for moving the carriage along the guide, means for driving the mandrel and the carriage moving means, a pivoted T-lever, a controlling means connected with the body part of the lever for stopping and starting the movement of the mandrel and of the carriage moving means, an abutment on the carriage concentric with the guide, and devices on the arms of the lever for engagement with the abutment irrespective of the angular position of the carriage to move the lever to bring the controlling means into stopping position when the carriage moves in one direction and into starting position when the carriage moves in the other direction.

48. In a machine for shaving sound-record tablets, the combination of a tablet-carrying mandrel, a knife-supporting carriage movable along a tablet on the mandrel, a driving motor, a casing surrounding the motor, an electrical resistance device entirely within the casing and electrically connected with the motor, and manually operable means accessible from the exterior of the casing for adjusting the resistance device.

49. In a machine for shaving sound-record tablets, the combination of a tablet-carrying mandrel, a knife-supporting carriage movable along a tablet on the mandrel, a driving motor, a casing surrounding the motor and provided with a slot in one wall, an electrical resistance device entirely within the casing and electrically connected with the motor, and manually operable means extending through the slot of the casing and movable therein for adjusting the resistance device.

50. In a machine for shaving sound-record tablets, the combination of a tablet-carrying mandrel, a knife-supporting carriage movable along a tablet on the mandrel, a driving motor, a casing having its top open, a cover plate for the casing supporting the mandrel and the carriage on its upper side and the motor on its lower side, and an electrical resistance device positioned within the casing and supported entirely independently of the said cover plate.

51. In a machine for shaving sound-record tablets, the combination of a tablet-carrying mandrel, a knife-supporting carriage movable along a tablet on the mandrel, a driving motor, a receptacle for shavings, a sheet-metal box surrounding the motor and the shavings receptacle, the box being provided with an opening bordered by a depressed flange slotted along one edge, a sheet-metal door formed to engage the depressed flange and provided with ears extending through the slots and having bent lobes to prevent removal, and a latch for holding the door in closed position.

52. In a machine for shaving sound-record tablets, the combination of a tablet-carrying mandrel, a knife-supporting carriage movable along a tablet on the mandrel, a driving motor, a receptacle for shavings, a sheet-metal box surrounding the motor and the shavings receptacle, the box being provided with an opening bordered by a depressed flange, a sheet-metal door formed to engage the depressed flange and hinged at one edge, and a latch pivoted to the door opposite the hinged edge and formed with one finger adapted to engage the inner surface of the flange and with another finger engaging the inner surface of the door to hold the first said finger in place.

53. In a machine for shaving sound-record tablets, the combination of a tablet-carrying mandrel, a carriage movable along a tablet on the mandrel, a knife on the carriage, means for manually adjusting said knife to take from the tablet a first rough-cut, and means automatically operable by the restoration of the carriage to initial position for advancing said knife to take the final finishing-cut of predetermined depth.

54. In a machine for shaving sound-record tablets, the combination of a tablet-carrying mandrel, a carriage movable along a tablet on the mandrel, a knife on the carriage, means for manually adjusting said knife to take from the tablet a first rough-cut, and means automatically operable upon completion of said first-cut and by the restoration of the carriage to initial position for advancing said knife to take the final finishing-cut of predetermined depth.

55. In a machine for shaving sound-record tablets, the combination of a tablet-carrying mandrel, a carriage movable along a tablet on the mandrel, a guide or way for said carriage on which the carriage is capable of both longitudinal and turning movement, a knife on the carriage, means for manually adjusting said knife to take from the tablet a first rough-cut, and means automatically operable by raising the carriage upon restoring the same to initial position for advancing said knife to take the final finishing-cut of predetermined depth.

In testimony whereof we have signed this specification in the presence of two subscribing witnesses.

FRANK L. CAPPS.
JOHN J. SCULLY.

Witnesses:
LESLIE S. EASTMAN,
J. S. GRIFFITH.